Sept. 10, 1935.  L. S. WILLIAMS  2,013,937
WEIGHING DEVICE
Filed Jan. 5, 1933  3 Sheets-Sheet 1
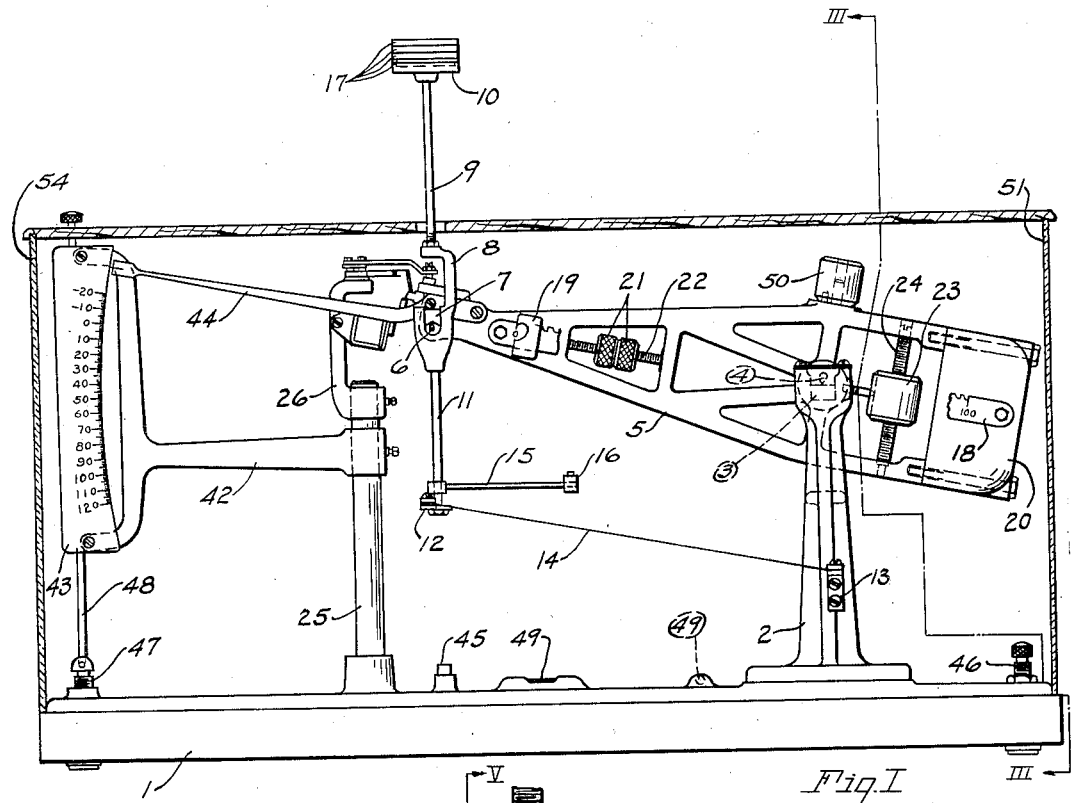
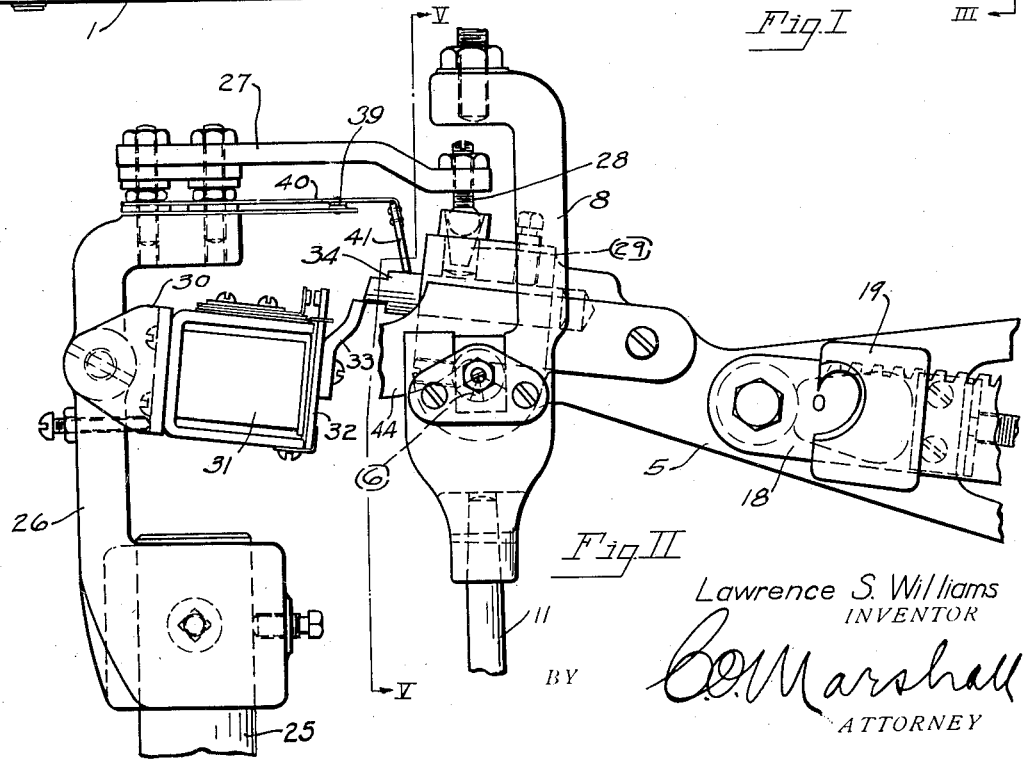
Lawrence S. Williams
INVENTOR
BY C. O. Marshall
ATTORNEY

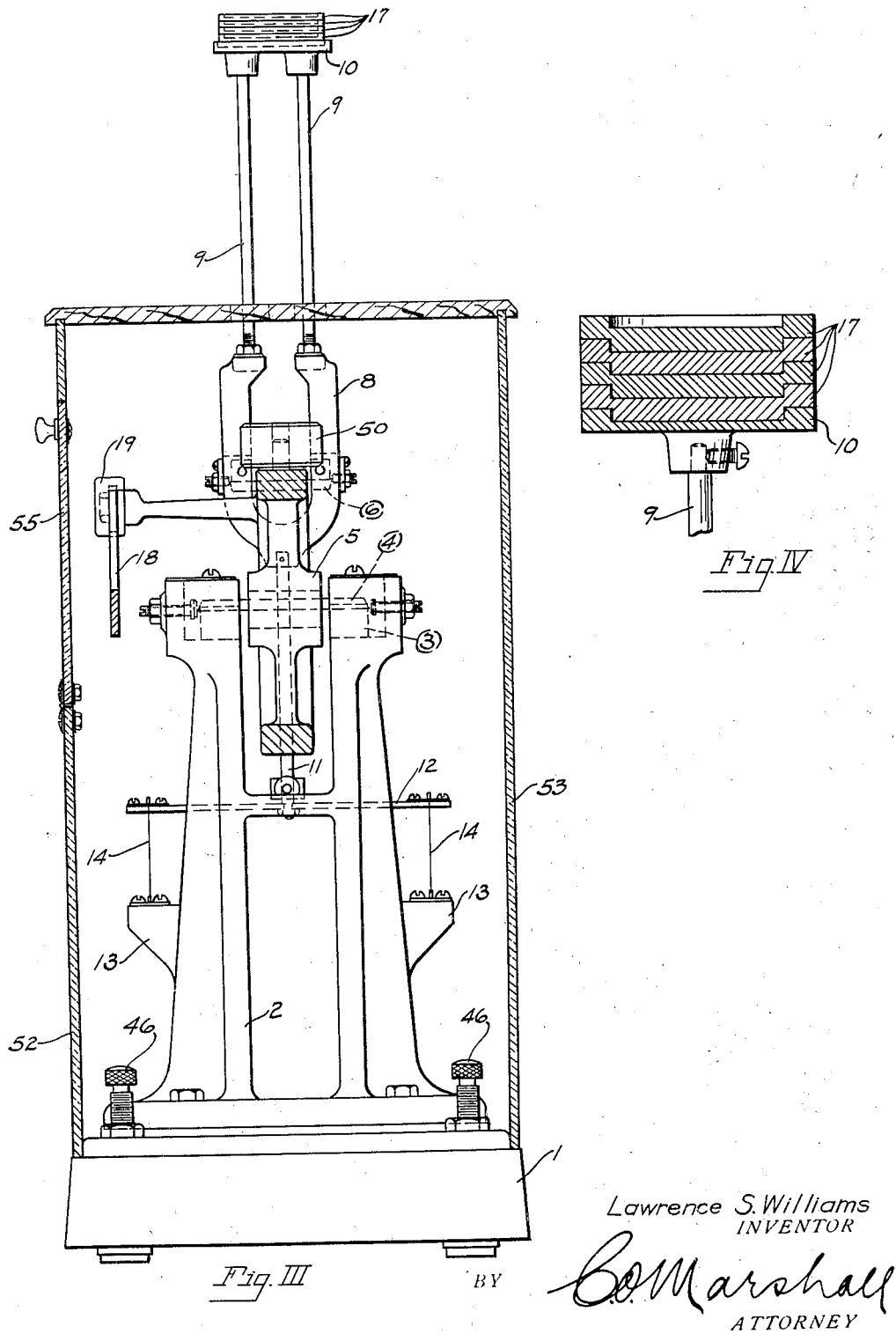

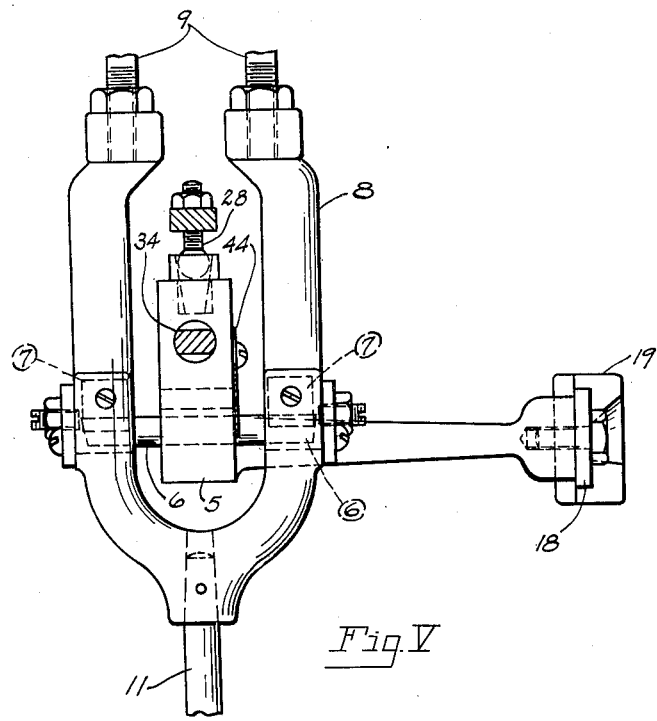
Fig. V
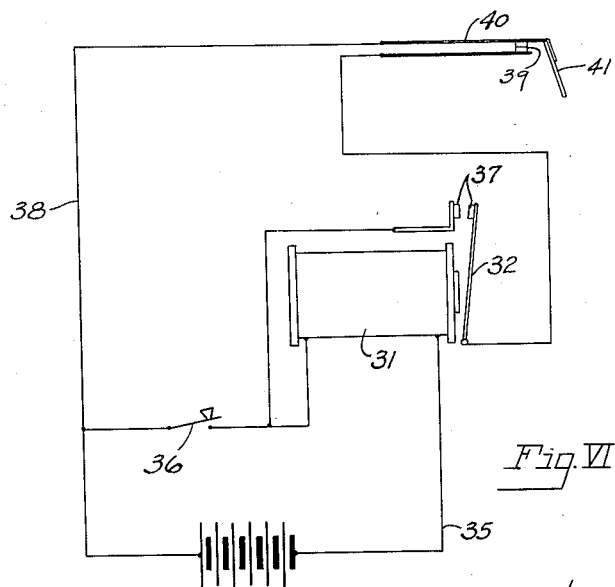
Fig. VI
Lawrence S. Williams
INVENTOR
BY C. O. Marshall
ATTORNEY Patented Sept. 10, 1935

2,013,937

UNITED STATES PATENT OFFICE 2,013,937

WEIGHING DEVICE

Lawrence S. Williams, Toledo, Ohio, assignor to Toledo Scale Manufacturing Company, Toledo, Ohio, a corporation of New Jersey Application January 5, 1933, Serial No. 650,273

11 Claims. (Cl. 265—27)

This invention relates to weighing devices and its principal object is the provision of means for determining weights of masses with great speed and precision.

Another object is the provision of an automatic weighing device capable of indicating weights without settling to rest.

Another object is the provision of means for determining variations in weights of nearly equal masses with great speed and precision.

Another object is to provide means for determining weights of masses by noting the effect of the inertia of such masses.

Another object is the provision of means for determining weights of masses by noting the effects of such masses on a swinging member.

Another object is the provision of means for determining weights of masses by connecting them individually to a pendulous swingable member, releasing the pendulous member from a given point and noting the extent of its first swing.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a device embodying my invention, the housing being shown in section and a beam forming an element of the invention being shown as partly broken away.

Figure II is an enlarged detail view showing parts of means for supporting loads to be weighed.

Figure III is an enlarged rear elevational view, partly in section, along the line III—III of Figure I.

Figure IV is an enlarged detail sectional view showing a variable load-receiver.

Figure V is an enlarged fragmentary detail sectional view taken on the line V—V of Figure II.

Figure VI is a wiring diagram showing catch release operating circuits.

Referring to the drawings in detail, the base 1 of the device supports adjacent one of its ends a fulcrum stand 2 provided with bearings 3 which are engaged by knife-edged fulcrum pivots 4 of a swingable frame 5.

The swingable frame 5 is so constructed as to possess maximum stiffness with minimum weight and in addition to the fulcrum pivots 4 it is provided with knife-edged load pivots 6 which are engaged by bearings 7 mounted in a load spider 8. The load spider 8 is provided with a pair of posts 9, to the upper ends of which is fixed a load-receiver 10, and is also provided with a depending stem 11, to the lower end of which is fixed a crosstree 12. Extending from the ends of the crosstree 12 to anchorages on brackets 13 secured to the fulcrum stand 2 is a pair of thin wires 14, preferably made of material not liable to stretch or kink and of length equal to the perpendicular distance between the fulcrum and load pivot axes. An arm 15 fixed to the stem 11 and carrying a weight 16 tends to swing the stem in a direction away from the fulcrum stand. The wires 14 are thus kept taut and the horizontal position of the load-receiver 10 is maintained.

The load-receiver 10 is equipped with a plurality of identical, removable poises 17 and with a notched beam 18 and slidable poise 19, the weight of the poises and other parts carried by the swingable frame being substantially counterbalanced by a counterweight 20. The position of the center of mass of the swingable assembly can be adjusted in a vertical plane both longitudinally of the frame 5 (by means of the balance nuts 21 threaded on the longitudinally extending shaft 22) and perpendicularly of the frame 5 (by means of the balance ball 23 threaded on the shaft 24 which extends perpendicularly to the direction of extension of the longitudinally extending shaft 22).

Fixedly mounted on the base 1 adjacent the left end of the swingable frame 5 is an upstanding post 25 having adjustably secured upon its upper end a bracket 26 which in turn supports an arm 27 having a ball-ended screw 28 threaded into its end. When the frame 5 swings into the position in which it is shown in Figure I a socket 29 in the end of the frame engages over the ball and thus insures exact positioning of the frame. Adjustably secured to the bracket 26 by means of a clip 30 is an electromagnet 31 having a hingedly mounted armature 32 carrying a detent 33, which when the parts are arranged as shown in Figures I and II engages a flat surface on the under side of a pin 34 that is adjustably fixed to and projects from the free end of the frame 5. The ball-ended screw 28 and the detent 33 thus retain the end of the frame 5 against movement in any direction.

For the purpose of energizing the electromagnet 31 to disengage the detent 33 from the pin 34, the magnet is wired into an energizing circuit 35 including a normally open push button switch 36. Carried by the armature 32 is one of a pair of contacts 37 which are wired into a sustaining circuit 38 that also includes a pair of interrupting contacts 39, one of which is located on a flexible finger 40 having a tip 41 adapted to be lifted by the pin 34 when the frame 5 swings the pin 34 above its position of Figures I and II.

Also supported upon the upstanding post 25 is a chart holder 42, to which is fastened a chart 43 having an arcuate series of indicia lying along the path of movement of a pointer 44 which extends from the frame 5 and is swingable therewith. The extent of the downward movement of the pointer 44 along the chart 43 depends upon the impulse given the frame 5 after release of the detent 33 and is limited by a bumper 45 so located as to be engaged by the lower end of the stem 11 if the device be loaded beyond capacity.

Proper condition of level of the device may be attained by turning a pair of leveling screws 46 and an additional leveling screw 47. The leveling screws 46 are intended to be turned to desired positions only when the device is being set up, but the additional leveling screw 47 is provided with a turning key 48 which makes it readily turnable whenever the condition of level of the device requires changing. The condition of level is indicated by a level glass 49. To equip the instrument for determination of weights within very close limits, an anti-pendulum weight 50 is removably mounted on the frame 5 above its fulcrum pivot, with the center of mass of the anti-pendulum weight in a plane passing through the fulcrum pivot axis and perpendicular to a plane passing through the load and fulcrum pivot axes. The working parts of the instrument, with the exception of the load-receiver, are protected by a housing, the walls 51, 52, 53 and 54 of which may be made of glass so that the working parts may be visible therethrough. The front wall 52 is preferably provided with a door 55, to close an opening through which the sliding poise 19 and the balancing nuts 21 and balancing ball 23 and anti-pendulum weight 50 are accessible.

Suppose the removable poises 17 on the commodity-receiver 10 each to weigh 100 grams. Suppose the beams 18 to have a capacity of 100 grams and suppose the sliding poise 19 to have 100 equally spaced, definite positions on the beam 18. Then movement of the sliding poise from the left end to the right end of the beam will have the same effect on the operation of the instrument as removal of one of the removable poises, and movement of the slidable poise to the right from one position to the next adjacent position will have the same effect as removal of one gram of load from the load-receiver 10. The chart 43 in such case may be graduated to indicate centigrams.

*Operation*

When the push button 36 is pressed the electromagnet 31 will withdraw the detent 33 from beneath the pin 34, thus releasing the swingable frame 5 and permitting it to swing in a counterclockwise direction. The push button 36 should then be released. If the instrument be in proper adjustment, with the several poises in the position in which they are shown in Figure I, and if one gram of load be in place on the load-receiver, the pointer will swing downwardly to the 100 centigram graduation and then immediately start to rise upon its back swing. After the beginning of the back swing the operator may take some of the load from the load-receiver and thus permit the assembly to continue to swing clockwise through an arc greater than the arc through which it swung counterclockwise. The continuation of the back swing will carry the pin 34 upwardly past the detent 33 which is being held withdrawn by the still energized electromagnet 31. At the top of the stroke the pin 34 will engage the tip 41 of the flexible finger 40 and separate the contacts 39, thus, the push button switch 36 being open, de-energizing the electromagnet 31 and permitting the detent 33 to again move under the pin 34 and again catch the frame in its position of Figure I.

If a load weighing more than one gram and less than 100 grams is to be weighed, the slidable poise 19 is moved to a position corresponding to the number of whole grams in the weight of the load (the number of whole grams in the weight of the load may be determined by rough weighing the load on an ordinary automatic scale). The load is then placed upon the load-receiver, the swingable assembly is released by pressing the button 36 and the lowermost point reached by the pointer at the end of its downward swing is noted. If, for example, the number of whole grams in a load were seventeen and the pointer were to swing downwardly to the seventy-third graduation, the weight of the load as thus determined would be 17.73 grams.

When the weight of a load to be weighed exceeds 100 grams one of the removable poises 17 for each 100 grams of weight in the load is removed from the load-receiver 10. If, for example, the load has been roughly determined to be 217+ grams, two of the removable poises 17 are removed from the load-receiver 10, the sliding poise 19 is set seventeen notches to the right of the position in which it is shown in Figures I and II, the load is placed upon the commodity-receiver, the switch button 36 is pressed and the graduation at the limit of the downward swing of the pointer is noted. If, for example, the pointer swings downwardly to the seventy-third graduation, the weight of the load as thus determined will be 217.73 grams.

The masses of the swingable assembly and the anti-pendulum weight 50 may be so proportioned that the pendulum effect of the frame 5 is increased tenfold by removal of the anti-pendulum weight 50. With the anti-pendulum weight 50 removed, each graduation on the chart has a value of 10 centigrams and it is only necessary to preliminarily determine the number of tens of grams in the load by rough weighing. Suppose, for example, the load by preliminary rough weighing were found to weigh 210+ grams. Two of the removable poises 17 would be removed from the load-receiver 10, the sliding poise 19 would be set in the tenth notch to the right of the position in which it is shown in Figures I and II, the load would be placed upon the commodity-receiver and the push button 36 pressed. If the pointer were observed to swing downwardly to beyond the seventy-seventh graduation the load would thus be determined to be 217.7+ grams. With the anti-pendulum weight 50 removed the load cannot be determined to as many decimal places but the assembly swings downwardly and returns much more rapidly, so that the operation can be more quickly performed.

My invention is particularly adapted for rapid weighing of substantially identical parts or packages to determine their variance from predetermined standards. For example, the instrument may be set so that, with a master or standard weight piston on the commodity-receiver, when the assembly is released by pressing the push button 39 the pointer will swing downwardly to a given graduation. Production pistons may then be rapidly tested and their variance from the standard noted. They may then be brought to standard weight by machining off surplus weight or by adding weight if they are deficient, or they may be sorted into lots, the individual pistons in each lot weighing the same within any desired tolerance. If it be desired to bring the pistons to standard weight by machining, the production pistons may purposely be all made slightly overweight so that there will always be a surplus to machine off and the chips which are machined off may be directed into the pan of a highly sensitive scale which may be arranged to stop the machining operation when the indicated surplus has been removed. If standard weight is to be attained by addition, the production pistons are purposely made slightly below standard weight and slugs are secured to them, by swedging, welding or otherwise, to bring them to the required standard weight.

Packages may likewise be weighed in rapid succession and those indicated to be below standard may be discarded.

The embodiment of my invention herein shown and described is to be regarded as illustrative only, and it is to be understood that the invention is susceptible to variation, modification and change within the spirit and scope of the subjoined claims.

Having described my invention, I claim:

1. In a dynamic weighing device, pendulous means capable of swinging freely under the influence of gravity, means whereby a load may be applied to said pendulous means at one side of a vertical plane passing through the fulcrum axis of said pendulous means, means for holding said load and pendulous means in definite position with their combined center of mass at one side of said vertical plane, and means for instantly eliminating the effect of said holding means to permit free swinging movement of said pendulous means.

2. In a dynamic weighing device, pendulous means capable of swinging freely under the influence of gravity, means whereby a load may be applied to said pendulous means at one side of a vertical plane passing through the fulcrum axis of said pendulous means, means for holding said load and pendulous means in definite position with their combined center of mass at one side of said vertical plane, means for instantly eliminating the effect of said holding means to permit free swinging movement of said pendulous means, and means for indicating the extent of the consequent first swing of said pendulous means.

3. In a dynamic weighing device, pendulous means capable of swinging freely under the influence of gravity, means whereby a load may be applied to said pendulous means at one side of a vertical plane passing through the fulcrum axis of said pendulous means, means for holding said load and pendulous means in definite position with their combined center of mass at one side of said vertical plane, and electrically-operated means for instantly eliminating the effect of said holding means to permit free swinging movement of said pendulous means.

4. In a dynamic weighing device, pendulous means capable of swinging freely under the influence of gravity, means whereby a load may be applied to said pendulous means at one side of a vertical plane passing through the fulcrum axis of said pendulous means, means for holding said load and pendulous means in definite position with their combined center of mass at one side of said vertical plane, said holding means including an electrically-operated catch and electromagnetic means for releasing said catch, said electromagnetic means comprising a circuit and means for manually closing said circuit to energize said electromagnetic means.

5. In a dynamic weighing device, pendulous means capable of swinging freely under the influence of gravity, means whereby a load may be applied to said pendulous means at one side of a vertical plane passing through the fulcrum axis of said pendulous means, releasable means for holding said load and pendulous means in definite position with their combined center of mass at one side of said vertical plane, said releasable holding means including an electrically-operated catch, manually operable means for releasing said catch and means for automatically holding said catch in released position during an initial and return swing of said pendulous means.

6. In a dynamic weighing device, a swingable member having load pivot means and fulcrum pivot means, load-receiving means supported on said load pivot means, means for adjusting the position of the center of mass of said swingable member and load-receiving means assembly, means for holding said assembly in definite position with its center of mass at one side of a vertical plane extending downwardly from its fulcrum pivot axis, and means for instantly eliminating the effect of said holding means to permit free swinging movement of said swingable member.

7. In a dynamic weighing device, a swingable member having load pivot means and fulcrum pivot means, load-receiving means supported on said load pivot means, means for vertically and longitudinally adjusting the position of the center of mass of said swingable member and load-receiving means assembly, means for holding said assembly in definite position with its center of mass at one side of a vertical plane extending downwardly from its fulcrum pivot axis, and means for instantly eliminating the effect of said holding means to permit free swinging movement of said swingable member.

8. In a dynamic weighing device, pendulous swingable means, means for connecting a load thereto, means for holding such load and said pendulous swingable means in definite position with their combined center of mass at one side of a vertical plane passing through the fulcrum axis of said pendulous means, means for instantly eliminating the effect of said holding means to permit free swinging movement of said pendulous means, and means for indicating variations in loads according to the extent of the consequent first swing of said pendulous swingable means.

9. In a dynamic weighing device, pendulous swingable means, means for connecting a load thereto, means for holding such load and said pendulous swingable means in definite position with their combined center of mass at one side of a vertical plane passing through the fulcrum axis of said pendulous means, means for instantly eliminating the effect of said holding means to permit free swinging movement of said pendulous means, means for indicating variations in loads according to the extent of the consequent first swing of said pendulous swingable means, and means for changing the pendulum effect of said pendulous swingable means.

10. In a dynamic weighing device, pendulous swingable means, means for connecting a load thereto, means for holding such load and said pendulous swingable means in definite position with their combined center of mass at one side of a vertical plane passing through the fulcrum axis of said pendulous means, means for instantly eliminating the effect of said holding means to permit free swinging movement of said pendulous means, means for indicating variations in loads according to the extent of the consequent first swing of said pendulous swingable means, and a slidable poise for changing the pendulum effect of said pendulous swingable means.

11. In a device of the class described, in combination, pendulous swingable means, means for connecting a load thereto, means for exactly positioning said swingable means in a given position, and means for releasing said swingable means therefrom, said positioning means including a ball engageable in a socket.

LAWRENCE S. WILLIAMS.